US008789682B2

(12) United States Patent
Fisher

(10) Patent No.: US 8,789,682 B2
(45) Date of Patent: Jul. 29, 2014

(54) ENGAGEMENT ARTICLE, LOAD POSITIONING SYSTEM, AND PROCESS FOR POSITIONING LOADS

(75) Inventor: Scott Fisher, Las Vegas, NV (US)

(73) Assignee: Tait Towers Manufacturing, LLC, Lititz, PA (US)

( * ) Notice: Subject to any disclaimer, the term of this patent is extended or adjusted under 35 U.S.C. 154(b) by 146 days.

(21) Appl. No.: 13/545,421

(22) Filed: Jul. 10, 2012

(65) Prior Publication Data

US 2013/0015042 A1 Jan. 17, 2013

Related U.S. Application Data

(60) Provisional application No. 61/506,245, filed on Jul. 11, 2011.

(51) Int. Cl.
*B65G 29/00* (2006.01)
*A63J 1/02* (2006.01)
*B66C 21/00* (2006.01)

(52) U.S. Cl.
CPC ... *A63J 1/02* (2013.01); *B66C 21/00* (2013.01)
USPC .................................... 198/465.4; 198/678.1

(58) Field of Classification Search
CPC ........ B65G 17/16; B65G 17/20; B65G 17/48; B65G 17/485; B65G 19/025; B66C 2700/01; B66C 2700/011; B66C 21/00; B66C 11/20; B66C 11/24; B66C 21/04; B66C 23/00; B66C 15/00; B66C 15/02
USPC .................. 198/465.4, 678.1, 680, 686, 685; 212/76, 77, 83, 84, 93, 96, 97, 98, 329, 212/336, 338
See application file for complete search history.

(56) References Cited

U.S. PATENT DOCUMENTS

| | | | | | |
|---|---|---|---|---|---|
| 393,285 | A | * | 11/1888 | Wood | 212/79 |
| 967,353 | A | * | 8/1910 | Ecton | 212/83 |
| 3,651,952 | A | * | 3/1972 | Mitchell | 212/84 |
| 4,058,295 | A | * | 11/1977 | Morfitt | 254/291 |
| 4,243,147 | A | * | 1/1981 | Twitchell et al. | 212/284 |
| 5,346,054 | A | * | 9/1994 | Kawasaka | 198/465.4 |
| 5,524,548 | A | * | 6/1996 | Fox | 104/89 |
| 5,735,507 | A | * | 4/1998 | Sierra Escudero et al. | 254/391 |
| 5,893,471 | A | * | 4/1999 | Zakula | 212/345 |
| 6,942,070 | B2 | * | 9/2005 | Ramseier et al. | 188/65.1 |
| 8,296,878 | B2 | * | 10/2012 | Imhoff | 5/85.1 |
| 8,374,420 | B2 | * | 2/2013 | Murakami | 382/153 |

* cited by examiner

*Primary Examiner* — James R Bidwell

(57) ABSTRACT

An engagement article is provided that is capable of selectively restricting movement or securing a suspended load in response to a rapid change in tension in one or more lines.

14 Claims, 9 Drawing Sheets

ENGAGEMENT ARTICLE, LOAD POSITIONING SYSTEM, AND PROCESS FOR POSITIONING LOADS

FIELD OF THE INVENTION

The present invention relates to an engagement article for selectively restricting motion of an article. More specifically, the present invention relates to a braking system for selectively restricting motion of an article.

BACKGROUND OF THE INVENTION

Loads positioned and repositioned within a system are often subjected to forces that can result in undesirable movement or safety concerns, for example, when a suspended load is moved laterally along a system, using a shuttle or cart along a track. It is known to suspend loads from moving shuttles, carriages, or carts in an effort to provide a theatrical or aesthetic effect, such as flying performers through a three dimensional space. These loads are frequently raised and lowered utilizing cables, wires or ropes deployed or retracted from a remote location. One challenge in maintaining safe operation of the shuttle, carriage, or cart is maintaining the position of the suspended load in the event of a partial or complete failure of the control system for the carriage. For example, a carriage controlled by wires may experience wire breakage wherein the load causes rapid or uncontrolled lateral motion of the shuttle and a rapid lowering of the load.

An article, system, and process capable of selectively restricting movement and/or capable of securing a load in response to a rapid change in tension in one or more lines would be desirable in the art.

SUMMARY OF THE INVENTION

In an exemplary embodiment, an engagement article is capable of selectively restricting movement or is capable of securing a load in response to a rapid change in tension in one or more lines.

In another exemplary embodiment, a system includes an engagement article capable of selectively restricting movement or securing a load in response to a rapid change in tension in one or more lines.

In another exemplary embodiment, process of selectively restricting movement or securing a suspended load includes providing an engagement article in response to a rapid change in tension in one or more lines and actuating the engagement article.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is an engagement article, a system including the engagement article, and a process of selectively actuating the engagement article to restrict movement of a carriage. Embodiments of the present disclosure are capable of selectively restricting movement, capable of securing a load (for example, in response to a rapid change in tension in one or more lines), capable of positioning and repositioning loads, capable of permitting coordinated movements of loads on a stage according to a predetermined program, and combinations thereof.

Figure 1:
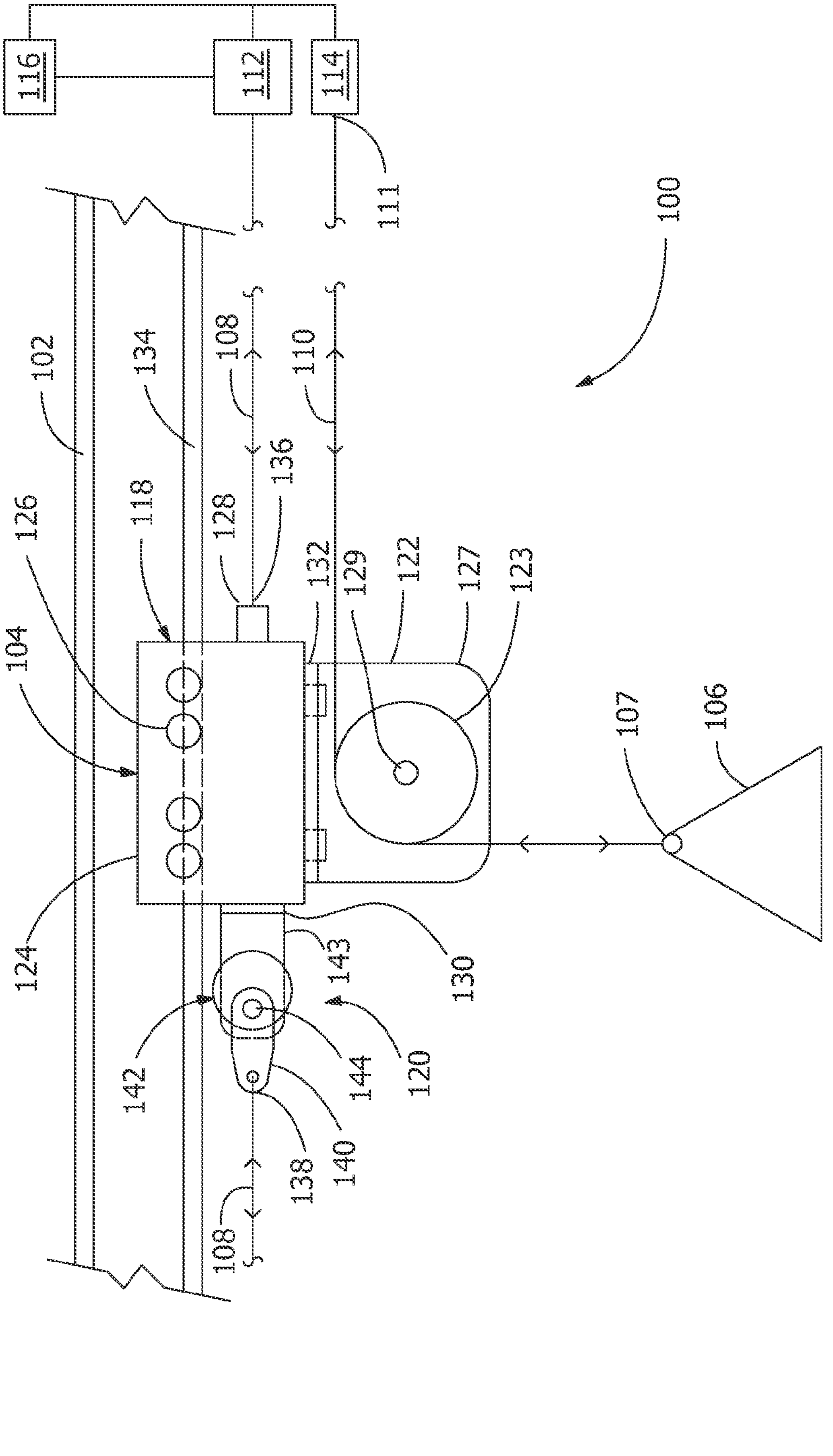
FIG. 1 shows a side schematic view of an exemplary system according to the disclosure.

FIG. 1 shows a system 100 according to the disclosure. In one embodiment, the system 100 includes at least one support member 102, at least one carriage 104, at least one load 106, at least one travel line 108, at least one lift line 110, a travel positioning mechanism 112, a lift positioning mechanism 114 operatively connected to each other, and at least one control system 116 to control system 100. The system 100 is configured to position and reposition a load 106 by movement of the travel line 108, the lift line 110, the travel positioning mechanism 112, the lift positioning mechanism 114, and the carriage 104, along the support member 102 according to a program executed by the control system 116.

In one embodiment, the support member 102 is a beam or other suitable member (for example, a track, a rail, a truss or a pipe) capable of providing structural support for the carriage 104 (or a suspended shuttle or cart or trolley or tram or any other apparatus capable of moving along the support member and being capable of supporting the load). In one embodiment, the support member 102 is mounted above a stage, exhibit, or theatrical area (not shown). In another embodiment, the system includes multiple support members 102 mounted at various angles (for example, about 0 degrees, about 5 degrees, about 10 degrees, about 15 degrees or about 30 degrees, or any suitable range or sub-range thereof) relative to the stage, exhibit, or theatrical area. In another embodiment, a plurality of the support members 102 are mounted at various angles relative to each other (for example, about 0 degrees, 5 degrees, 10 degrees, 15 degrees, 30 degrees, about 45 degrees or any suitable range or sub-range thereof), stacked, positioned parallel, intersecting, or positioned in any suitable combination thereof.

The support member 102 is any suitable geometry. In one embodiment, the support member 102 is a substantially straight, elongate member. In another embodiment, the support member 102 is curved, or has curved portions. In one embodiment, the support member 102 is segmented, including connector members (not shown) joining the various segments. Alternatively, the support member 102 is of unitary construction.

The load 106 is any suitable object capable of being positioned and repositioned relative to the stage, exhibit, or theatrical area. Suitable loads include, but are not limited to, performers, equipment, instruments, props, lights, lighting systems, cameras, scenery, sets, microphones, speakers in combinations thereof.

The travel line 108 and the lift line 110 are elongate members such as cables, rope, cord, band or chain-links, or any suitable combination thereof. In one embodiment, the system 100 further includes one or more additional support guides (not shown) for supporting the lift line 110 securely in its travel path as the carriage 104 moves along the support member 102. The travel line 108 and the lift line 110 are control elements that provide motion and positioning to the carriage 104 and/or the load 106. In one embodiment, the travel line 108 is operatively connected to the carriage 104 and to travel positioning mechanism 112. When actuated, the travel positioning mechanism(s) 112 controls or adjusts the position, speed, and acceleration or deceleration of the carriage 104 along the support member 102. Travel positioning mechanism 112 controls the travel line 108 operation, enabling carriage 104 to be moved, positioned, and repositioned along support member 102. The lift line 110 is operatively connected through carriage 104 to the load 106 and to the lift positioning mechanism 114. The lift positioning mechanism 114 controls the lift line 110 operation in simultaneous coordination with the travel line 108 operation, enabling load 106 to be positioned and repositioned as carriage 104 is positioned and repositioned along support member 102.

The lift positioning mechanism 114 controls or adjusts the position, speed, and acceleration or deceleration of the load 106 relative to the carriage 104. The travel positioning mechanism 112 controls or adjusts the position, speed, and acceleration or deceleration of the carriage 104 relative to the support member 102. In one embodiment, one or more of the travel positioning mechanism(s) 112, and the lift positioning mechanism 114 is an automated device, such as a variable control or computer controlled winch. In another embodiment, one or more of the travel positioning mechanism(s) 112 and the lift positioning mechanism 114 is a manual device capable of rotatably extending or retracting the travel line 108 and/or the lift line 110. The term manual device means that neither variable control nor computer control is utilized for the device to operate. In a further embodiment, the travel positioning mechanism 112 and the lift positioning mechanism 114 is a combination of a manual device and an automated device.

In one embodiment, the carriage 104 includes a cart 118, an engagement article such as a cam brake 120, and a load mount 122. The cart 118 includes a cart frame 124 and a plurality of wheels or rollers 126. The cart frame 124 includes a travel line connection 128 on one end, a cam brake connection 130 on an opposite end, and a load mounting member connection 132 positioned proximal to the load 106. The plurality of wheels or rollers 126 is configured to engage, roll, and/or slide along an engagement surface 134 of the support member 102, enabling the cart 118 and carriage 104 to move along the support member 102. In one embodiment, a first end 136 of the travel line 108 is operatively connected to the travel line 108 connection 128 of the cart frame 124 and a second end 138 of the travel line 108 is operatively connected to the cam brake 120.

The load mount 122 includes at least one pulley or sheave 123, a pulley frame 127, and a pivot shaft 129. The pulley frame 127 attaches to the load mounting member connection 132 of the cart frame 124. The pulley or sheave 123 is rotatably mounted to the pulley frame 127 with the pivot shaft 129. The pulley or sheave 123 is configured to engage the lift line 110 to position the load 106. A first end 107 of the lift line 110 is connected to the load 106, and a second end 111 is connected to the lift positioning mechanism 114.

Figure 2:
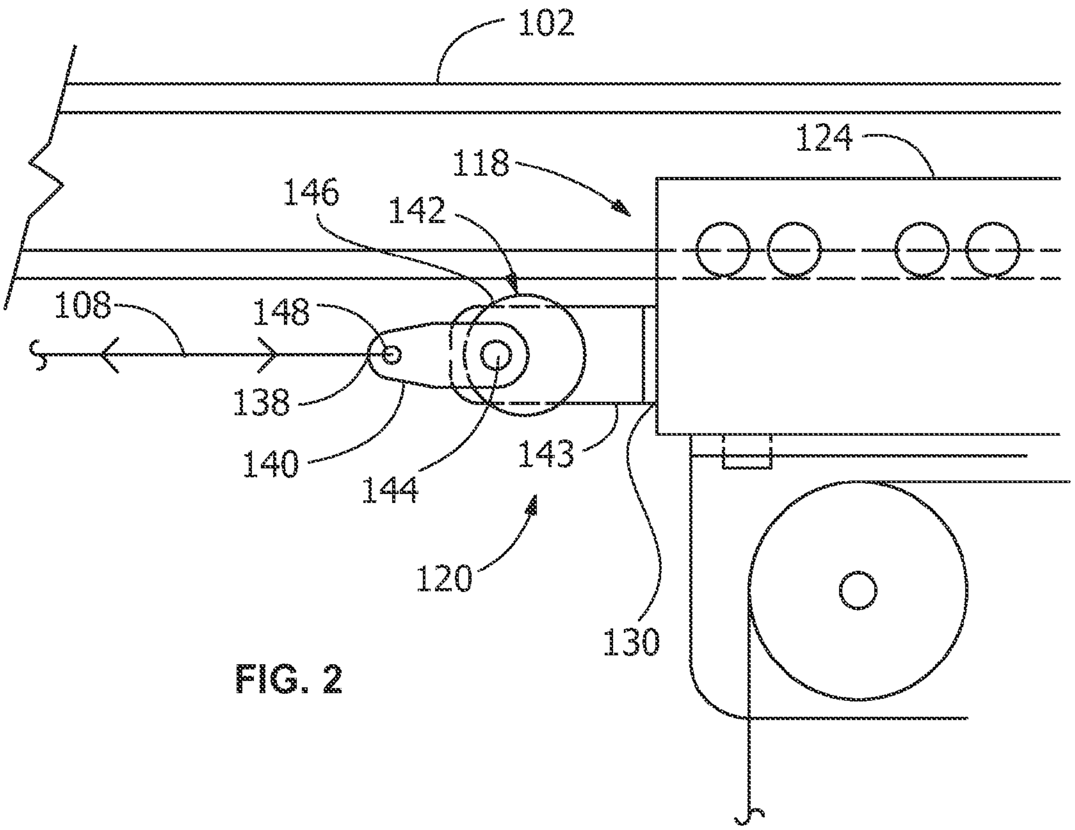
FIG. 2 shows a side schematic view of an exemplary engagement article permitting movement according to the disclosure.
Figure 3:
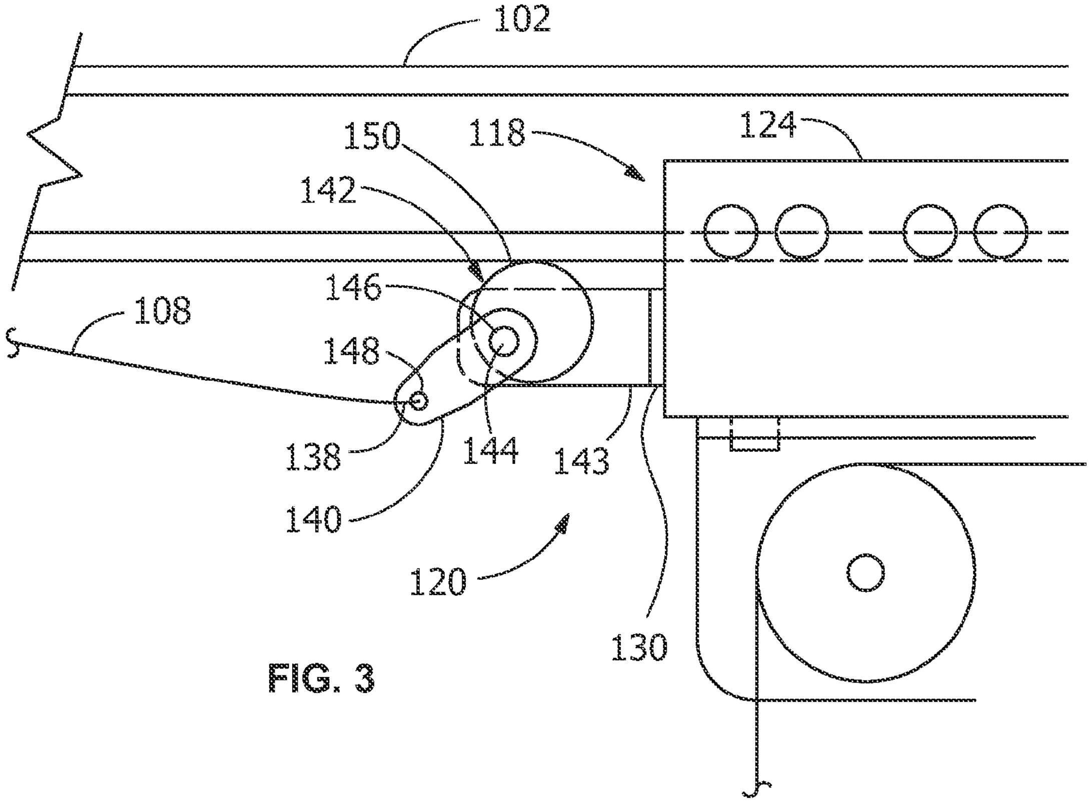
FIG. 3 shows a side schematic view of an exemplary engagement article restricting, but not stopping movement according to the disclosure.
Figure 4:
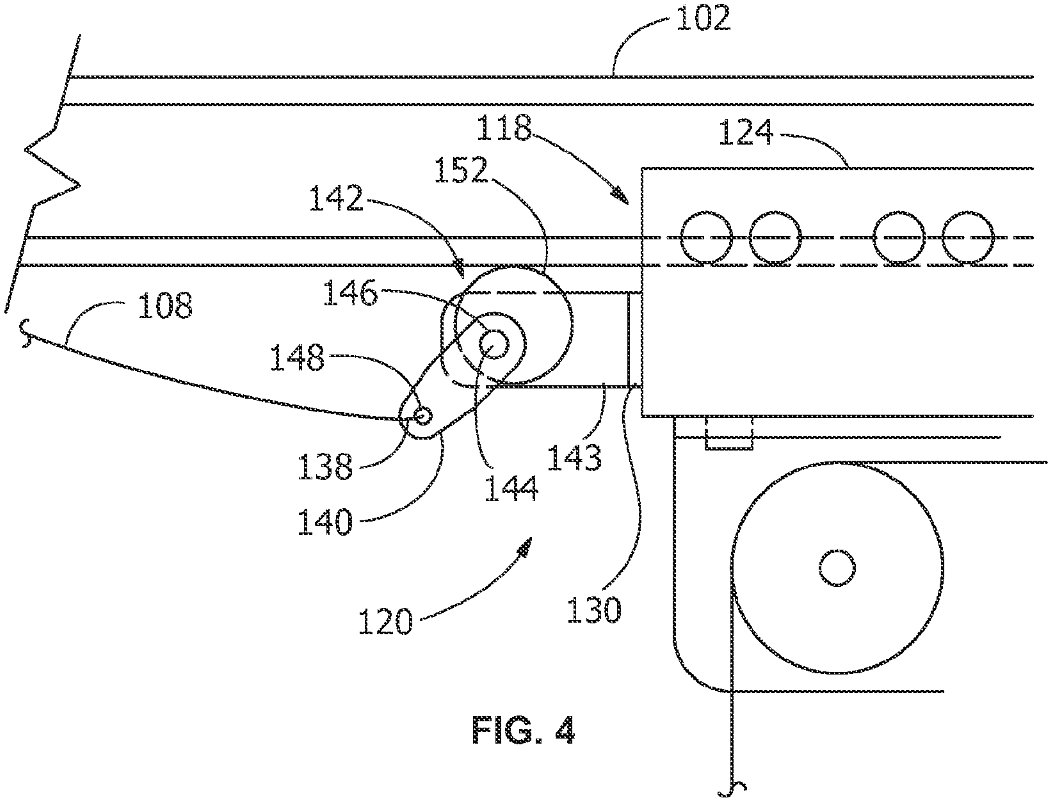
FIG. 4 shows a side schematic view of an exemplary engagement article restricting and stopping movement according to the disclosure.

As shown in FIGS. 2-4, in one embodiment, the cam brake 120 includes a weighted member 140, a cam engagement member 142, a frame 143, and a cam pivot member 144. In one embodiment, cam engagement member 142 and weighted member 140 are of the unitary construction. In one embodiment, an optional airflow interaction feature 154 may be formed in one or more of weighted member 140 and cam engagement feature 142 to facilitate rotation of the cam engagement member 142 about cam pivot member 144. In a further embodiment, airflow interaction feature 154 may be utilized in combination with or as a substitute for weighted member 140, in which case the airflow interaction feature 154 would only be formed in cam engagement feature 142. The cam pivot member 144 is pivotally connected to the cam engagement member 142 eccentrically with respect to the center of gravity of the cam engagement member 142. For example, this eccentric mounting enables the cam engagement member 142 to be rotated about cam pivot member 144 into and out of a position of engagement with support member 102, by the displacement of weighted member 140 (or by virtue of airflow interaction feature(s) 154 interacting with slower moving air surrounding the cam engagement member 142 having the airflow interaction feature(s)).

As used herein, airflow interaction feature 154 may be used as an airfoil to provide an upwardly directed force also referred to as lift, or as a "spoiler" to provide a downwardly directed force, such as used with top fuel dragsters to maintain traction between the tires and the road surface. That is, factors such as the location of airflow interaction feature 154 relative to cam pivot member 144 and the desired magnitude and direction of airflow-induced forces withstood by airflow interaction feature 154 over the range of angular movement of cam pivot member 144 as a function of velocity of the carriage may be considered in order to determine the shape and/or orientation of the airflow interaction feature.

In one embodiment, a first portion 146 of the weighted member 140 is connected to the cam engagement member 142 at the cam pivot member 144. A second portion 148 of the weighted member 140 is connected to the second end 138 of the travel line 108. In one embodiment, the center of gravity of the weighted member 140 is located at the second portion 148, or closer to the second portion 148 than the first portion 146, proximal to the connection of the travel line 108.

Figure 9:
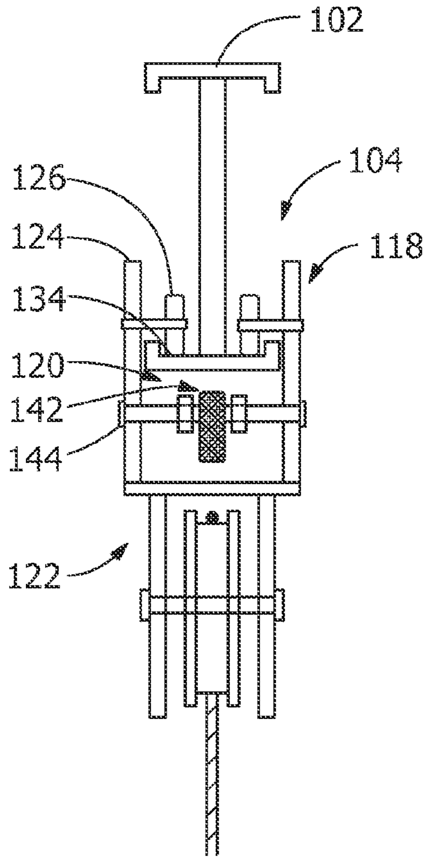
FIG. 9 shows an end schematic view of an exemplary system according to the disclosure.
Figure 10:
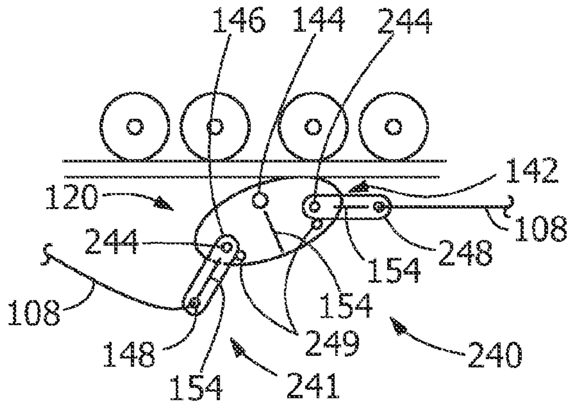
FIGS. 10, 10A and 10B show side schematic views of respective exemplary engagement articles according to the disclosure.
Figure 11:
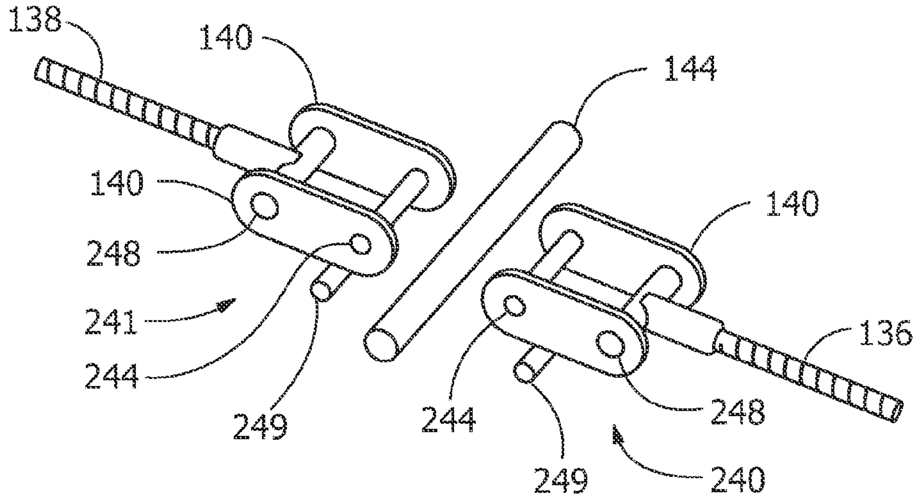
FIG. 11 shows a perspective view of dual lever assemblies for an exemplary engagement article according to the disclosure.

Referring to FIGS. 9-11, in one embodiment, the carriage 104 includes the cart 118, the cam brake 120, and the load mount 122. In this embodiment, the cart 118 includes the cart frame 124 and the plurality of wheels or rollers 126. The cam brake 120 includes first lever assembly 240, second lever assembly 241, the cam engagement member 142, and the cam pivot member 144. Each of first lever assembly 240 and second lever assembly 241 includes a lever pivot 244 and a pair of weighted members 140 with a travel line connection 248. The cam engagement member 142 includes a pair of opposing limit stops 249.

In one embodiment, the cam engagement member 142 pivotally connects to the cart frame 124 via the cam pivot member 144. In one embodiment, the pair of the weighted members 140 pivotally connects at their first portions 146 to the cam engagement member 142 via the lever pivot 244. In one embodiment, optional airflow interaction feature 154 may be utilized in combination with or as a substitute for weighted member 140, in which case the airflow interaction feature 154 would only be formed in cam engagement feature 142. In one embodiment, cam engagement member 142 may employ airflow interaction feature 154, a biasing device 167 (FIG. 1), weighted member 140 or a combination thereof.

In one embodiment, the travel line connection 248 connects to the second portion 148 of the weighted member 140. The first lever assembly 240 connects to the first end 136 of the travel line 108, and the second lever assembly 241 connects to the second end 138 of the travel line 108.

In one embodiment, the travel line 108 forms a loop (not shown) that engages one or more of the travel positioning mechanisms 112, enabling the carriage 104 to be moved in either direction along the support member 102.

Figure 10B:
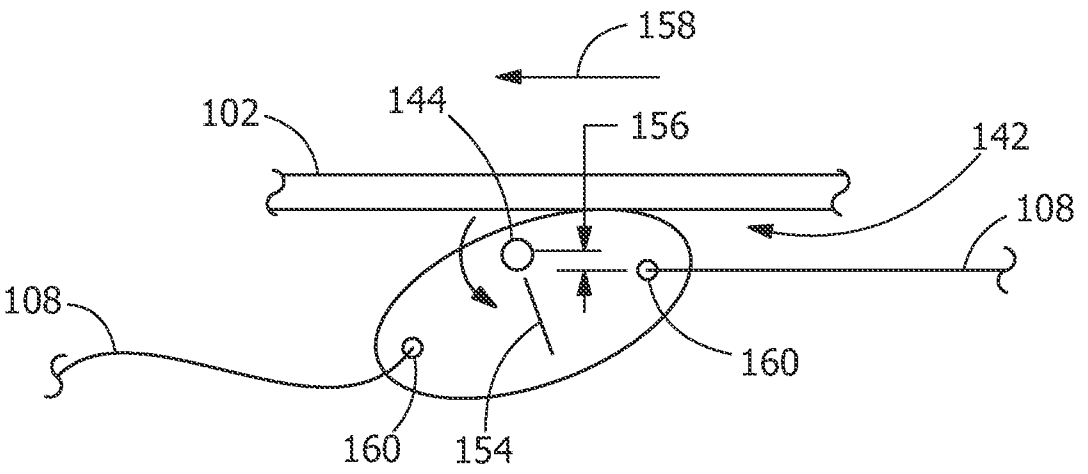

As shown in FIG. 10B, travel line connections 160 formed in cam engagement feature 142 are arranged relative to cam pivot member 144 such that line-of-force spacing 156 is maintained between cam pivot member 144 and either travel line connection 160, even after cam engagement feature 142 is rotated into contact with support structure 102. With such an arrangement, in the case of a sudden loss of tension of travel line 108 formerly pulling a carriage (not shown) connected to cam engagement feature 142, residual tension in the opposed travel line 108 directed opposite travel direction 158 would further result, at least initially, in urging cam engagement feature 142 in a clockwise direction, and could supplement other similarly directed forces, such as forces associated with airflow interaction feature 154.

Figure 10A:
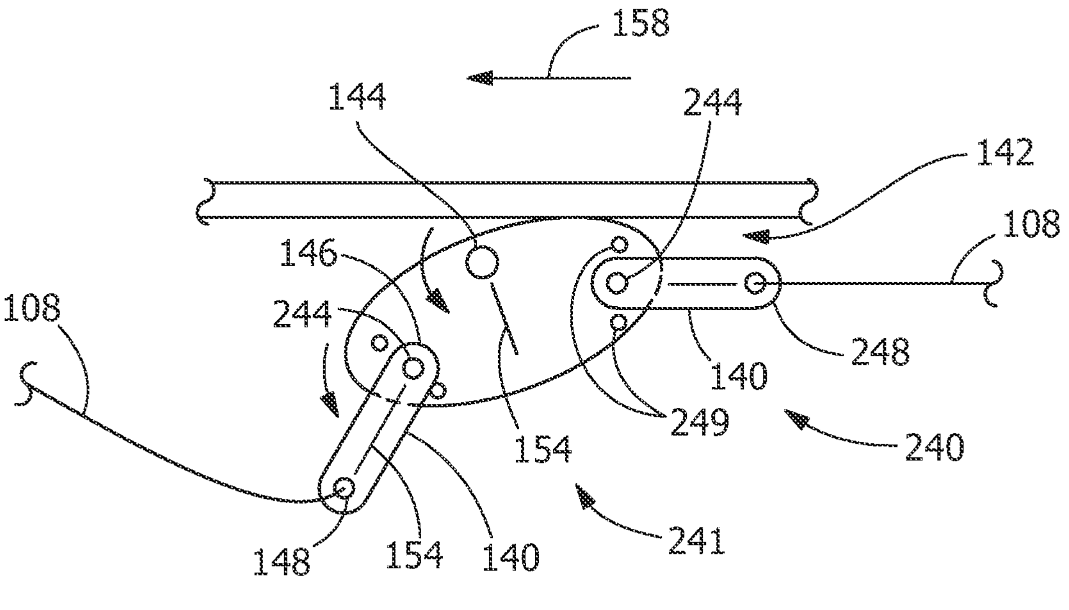

As further shown in FIG. 10A, limit stops 249 position first and second lever assemblies 240, 241 such that forces generated in by airflow interaction devices 154 are maximized in a direction opposite the travel direction of the carriage to decelerate or stop the carriage, and supplemented by optional airflow interaction devices 154 formed in cam engagement feature 142. That is, limit stops 249 associated with first and second lever assemblies 240, 241 can orient the lever assembly pointing in a direction opposite that of carriage travel such that airflow forces associated with airflow interaction features further supplement forces applied to secure cam engagement feature 142 in frictional contact with support member 102.

Referring again to FIG. 1, in one embodiment, the control system 116 includes computers or microprocessors (not shown), and/or other suitable control devices. In one embodiment, the control system 116 includes remote-control capabilities, various suitable user interfaces, and communication between the remote-control devices and/or user interfaces and the travel positioning mechanism 112 and/or lift positioning mechanism 114. In one embodiment, the travel positioning mechanism 112 and/or lift positioning mechanism 114 include suitable power and control devices such as servomotors (not shown) and position encoders (not shown). In one embodiment, the control of a predetermined movement or positioning sequence of the carriage 104 and load 106 is enacted according to a control program using algorithms or other suitable means. For example, the user may require raising the load 106 at a first predetermined rate (such as two feet per second) as the carriage 104 moves from left to right along support member 102 at a second predetermined rate (such as one foot per second). To raise the load 106, the control program initiates coordinated retraction movement of the lift line 110 and the travel line 108, incorporating feedback from the position encoders to control the servomotors. In one embodiment, the position of the lift line 110 and the vertical position of the load 106 are varied by the control system 116 as the carriage 104 moves along the support member 102. In one embodiment, the control system 116 is capable of maintaining a constant elevation of the load 106 as the carriage 104 moves along the support member 102.

The control system 116 communicates (for example, transmits and/or receives signals and/or data) with and adjusts the lift positioning mechanism(s) 114 and travel positioning mechanism(s) 112 to coordinate the position of the load 106. Control communication includes wireless (infrared (IR), radio frequency (RF), etc.), wired/electrical, mechanical (distance measuring of line), and sensors (position, weight, speed, vibration, acoustic; acoustic being used for keeping operation below a predetermined sound level while moving as fast as possible).

The control system 116 communicates with and adjusts the travel positioning mechanism(s) 112 to maintain the cam brake 120 in a full tension position such that the cam engagement member 142 is held out a predetermined range of distance from the support member 102 surface.

Referring collectively to FIGS. 3 and 4, the cam engagement member 142 includes upper portion 150 and top section 152. An external portion of upper portion 150 and top section 152 is configured to engage the support member 102. In one embodiment, the external portions of upper portion 150 and/or top section 152 are serrated, knurled, grooved, or at least partially define a geared surface having protruding or recessed teeth corresponding to the mating surface of the support member 102. Additionally or alternatively, the external portions of upper portion 150 and/or top section 152 include geometry capable of selectively engaging the surface of the support member 102. In one embodiment, the system 100 includes brake pads or shoes positioned on the cam engagement member 142 to frictionally engage the support member 102. In one embodiment, the control system 116 includes sensors (not shown) that determine when the cam engagement member 142 has engaged the support member 102, and the control system 116 uses this status to signal or otherwise initiate other control operations, such as deactivating motors associated with one or more of the lift positioning mechanism(s) 114 and travel positioning mechanism(s) 112 and alerting an operator. The position of the cam engagement member 142 relative to the support member 102 resulting in frictional engagement is controlled by the control system 116 to provide a predetermined deceleration or braking of the carriage 104. In another embodiment, a purely mechanical linkage may be actuated to selectably position cam member 142 relative to the support member 102, resulting in a predetermined frictional engagement, which engagement may or may not be a function of an operating parameter, such as the velocity of the carriage.

The control system 116 adjusts the travel positioning mechanism(s) 112 to maintain the cam brake 120 in deceleration position by producing slack at the second end 138 of the travel line 108, causing the weighted member 140 of the cam brake 120 to actuate due to gravity and rotate the cam engagement member 142 about the cam pivot member 144. Alternatively, slack at the second end 138 of the travel line 108 occurs due to a rapid change or failure of one or more control elements such as a rapid change in tension in one or more lines, (for example, upon breaking of the travel line 108 proximal to the second end 138). As shown in FIG. 3, the slack enables an upper portion 150 of the cam engagement member 142 to frictionally engage the support member 102 surface to cause deceleration of the carriage 104. Thereafter, increasing tension at the second end 138 of the travel line 108 causes the weighted member 140 of the cam brake 120 to rise and rotate the cam engagement member 142 about the cam pivot member 144 in the opposite direction, disengaging the cam engagement member 142 from the support member 102 surface, and freeing the carriage 104 for movement along the support member 102. In one embodiment, the control system 116 sensors (not shown) determine when the cam engagement member 142 has fully disengaged the support member 102, and the control system 116 uses this status to signal other control operations, such as activating motors associated with the lift positioning mechanism(s) 114 and travel positioning mechanism(s) 112 and alerting an operator.

Referring to FIGS. 9-11, in one embodiment, when the carriage 104 is moving in a first direction along the support member 102, the control system 116 produces slack at the second end 138 of the travel line 108 to cause deceleration or stopping of the carriage 104. Alternatively, slack at the second end 138 of the travel line 108 occurs due to a rapid change in tension in one or more lines in the system. When the carriage 104 is moving in a second direction along the support member 102, the control system 116 produces slack at the first end 136 of the travel line 108 to cause deceleration or stopping of the carriage 104. Alternatively, slack at the first end 136 of the travel line 108 occurs due to wear and/or deterioration in the system, (for example, upon the travel line 108 proximal to the second end 138 breaking).

Figure 12:
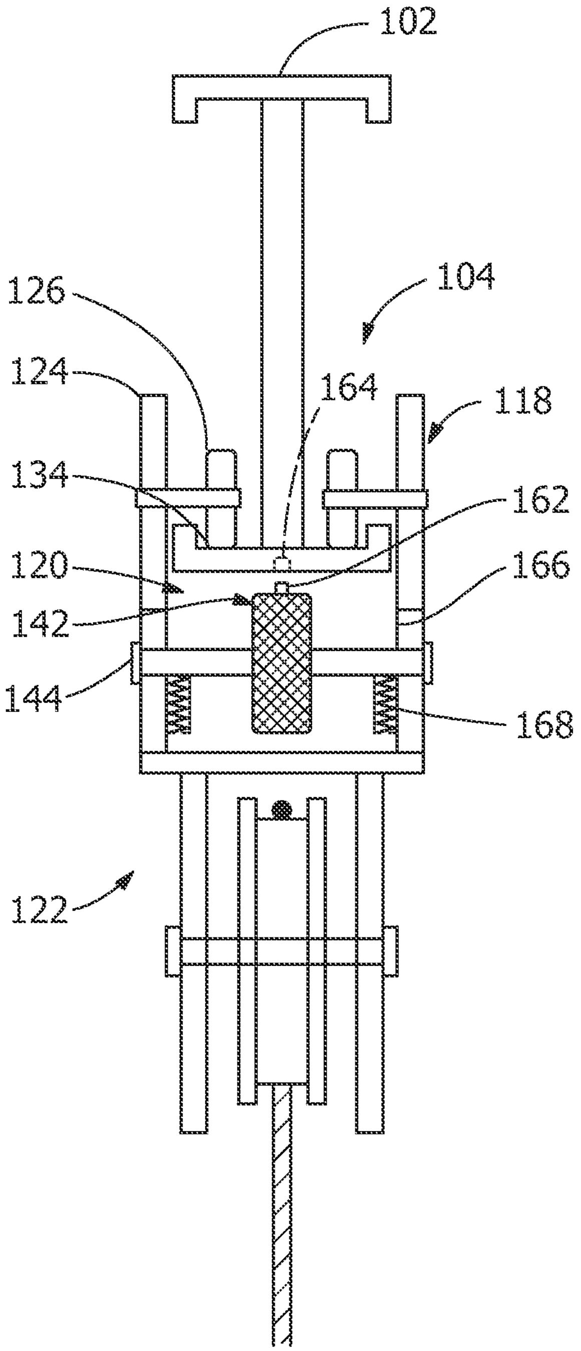
FIG. 12 shows an end schematic view of an exemplary system according to the disclosure.
Figure 13:
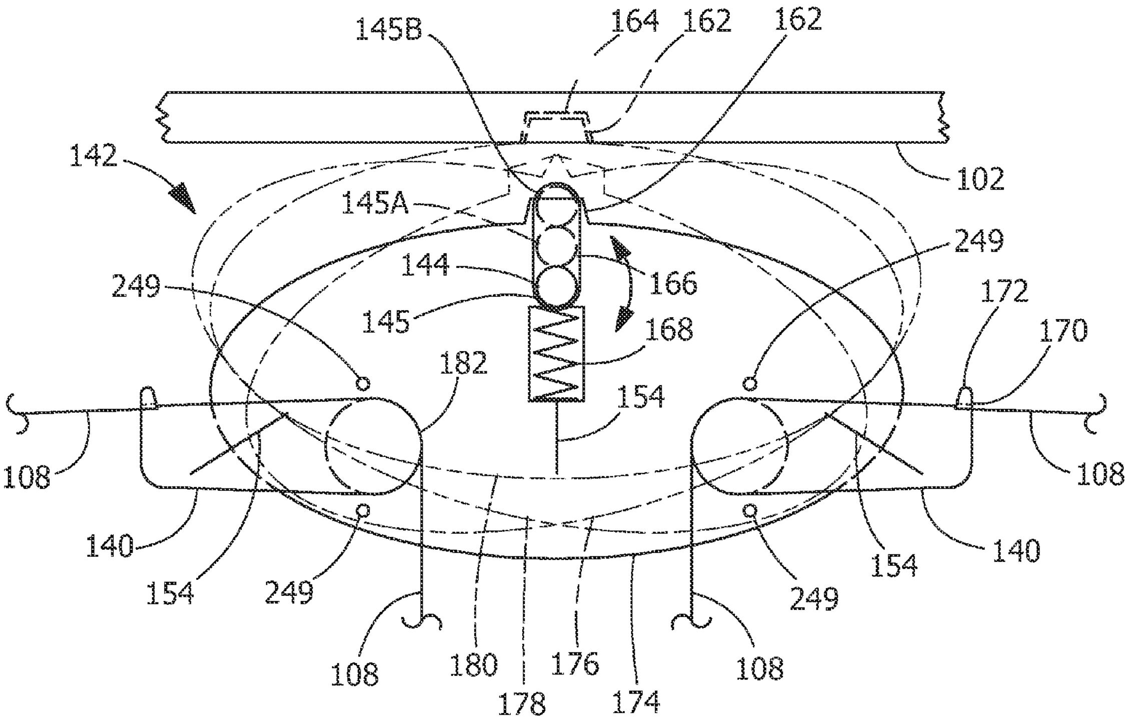
FIG. 13 shows a side schematic view of an exemplary engagement article according to the disclosure.

Referring collectively to FIGS. 12-13, cam engagement member 142 includes a position retention feature 162 for engaging a mating feature 164 formed in support member 102 in special circumstances, such as when tension in opposed travel lines 108 is simultaneously removed by an operator, or if automated, by the system. In this circumstance, engagement between retention feature 162 and mating feature 164 ensures the carriage does not move relative to the support member 102, reducing wear associated with using opposed tension between the opposed travel lines, thereby extending the service life of the system. As shown in the figures, travel lines 108 extend about a pulley 182 and extend through a passageway 170 formed in a tab 172 of weighted member 140.

Engagement of retention feature 162 with mating feature 164 is achieved by at least one (an opposed pair shown in FIG. 12) biasing device 168, such as a compression spring cartridge secured to cart frame 124 urging cam engagement member 142 toward support member 102. Biasing device 168 urges cam pivot member 144 along slot 166 toward a fully extended position 145B. However, opposed travel lines 108 are arranged such that during normal operation of the carriage, in which tension is maintained in the travel lines 108 to control the position of the carriage, the tension in travel lines 108 is also utilized to maintain biasing device 168 in a fully compressed position 145. Upon selectably controlled release of tension in travel lines 108, biasing device 168 is permitting to fully extend, urging cam pivot member 144 along slot 166, permitting position retention feature 162 and mating feature 164 of support member 102 to engage. Cam engagement member 142 is urged from operating position 174 to locking position 180. In locking position 180, retention feature 162 sufficiently engages mating feature 164 to ensure cam engagement member remains in locking position 180 until tension in travel lines 108 is reintroduced.

In response to a rapid loss of tension by one of travel lines 108 such as by failure of the travel line, cam engagement member 142 is urged into either first engagement position 176 or second engagement position 178, in which a portion of the periphery of cam engagement feature 142 contacts support member 102. However, in both first engagement position 176 and second engagement position 178, due to the rotation of cam engagement member 142 about cam pivot member 144, the position of cam pivot member 144 in an intermediate position 145A, and sizing of retention feature 162, retention feature 162 does not contact support member 102.

Referring to FIG. 4, in one embodiment, the control system 116 (see FIG. 1) controls the travel positioning mechanism(s) (see FIG. 1) to maintain the cam brake 120 in locking position by producing an increased amount of slack at the second end 138 of the travel line 108, causing the weighted member 140 to actuate and rotate the cam engagement member 142 additionally about the cam pivot member 144. Alternatively, increased slack at the second end 138 of the travel line 108 occurs due to a rapid change in tension in one or more lines. In one embodiment, a top section 152 of the cam engagement member 142 is configured to frictionally engage the engagement surface 134 of the support member 102 surface to halt the carriage 104 and prevent it from moving along the support member 102. Thereafter, increasing tension at the second end 138 of the travel line 108 causes the weighted member 140 of the cam brake 120 to rotate back to the original position, thus rotating the cam engagement member 142 about the cam pivot member 144 in the opposite direction, disengaging the cam engagement member 142 from the support member 102 surface, and freeing the carriage 104 for movement along the support member 102.

Referring again to FIGS. 9-11, in one embodiment, removing tension at the second end 138 of the travel line 108 causes the weighted member 140 to rotate and drop, and the second lever assembly 241 to rotate about the lever pivot 244 until reaching the limit stop 249. The force from weighted member 140 against the limit stop 249 causes the cam engagement member 142 to rotate in a first direction and frictionally engage the support member 102. Similarly, removing tension at the first end 136 of the travel line 108 causes the weighted member 140 to rotate and actuate, and the first lever assembly 240 to rotate about the lever pivot 244 until reaching the limit stop 249. The force from weighted member 140 against the limit stop 249 causes the cam engagement member 142 to rotate in a second direction and frictionally engage the support member 102.

In one embodiment, such as shown in FIG. 1, the cam brake 120 includes a biasing device 167, such as a torsion spring (shown), compression spring or other suitable device using a resilient material having a retention force, the cam engagement member 142, the cart frame 124, and the lever pivot 244. Biasing device 167 releases the cam engagement member 142, allowing it to rotate when tension is removed from the second end 138 of the travel line 108. In one embodiment, the carriage includes the cart frame 124, cam brake 120, and the plurality of wheels 126 for positioning and repositioning a load 106.

Figure 5:
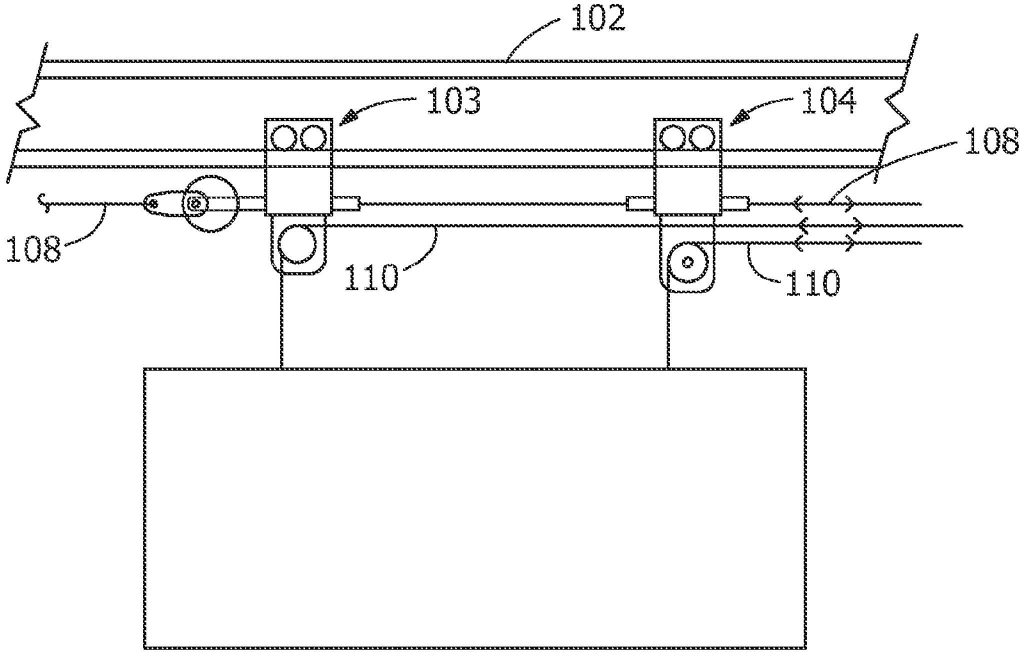
FIG. 5 shows a side schematic view of an exemplary system according to the disclosure.

Referring to FIG. 5, in one embodiment, the system 100 includes the support member 102, a first carriage 103, a second carriage 104, disposed in series along the support member 102, the travel line 108, a plurality of the lift lines 110, the travel positioning mechanism 112 (see FIG. 1), the lift positioning mechanisms 114 (see FIG. 1), and the control system 116 (see FIG. 1).

Figure 6:
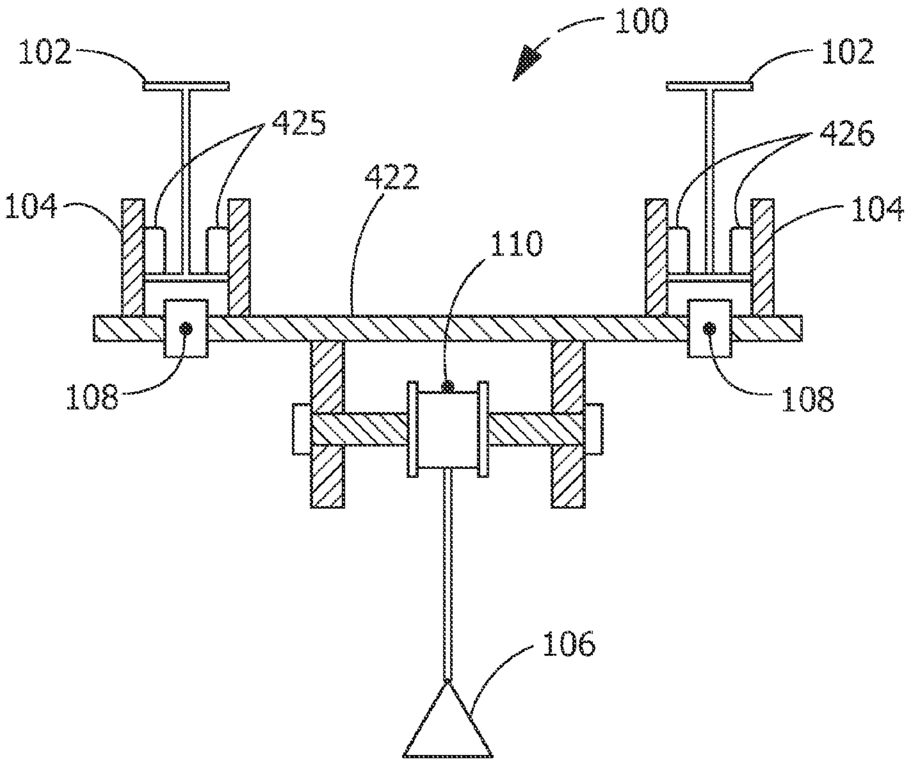
FIG. 6 shows an end schematic view of an exemplary system according to the disclosure.

Referring to FIG. 6, in another embodiment, the system 100 includes a pair of the support members 102, a pair of the carriages 104, each of the carriages 104 mounted on each of the support members 102, a load mount assembly 422, the travel line 108, the lift line 110, the travel positioning mechanism 112 and/or the lift positioning mechanism 114 (see FIG. 1), and the control system 116 (see FIG. 1). In one embodiment, a first set 425 of the wheels 126 engages a first support member 402, and a second set 426 of the wheels 126 engages a second support member 102.

Figure 7:
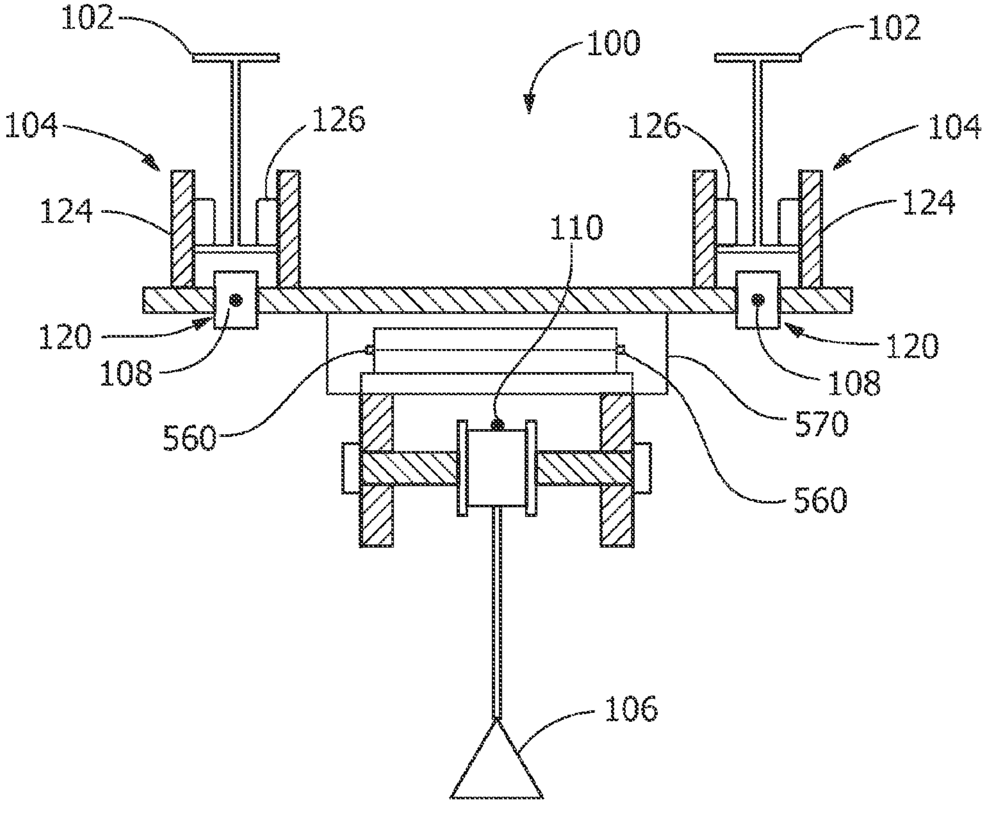
FIG. 7 shows an end schematic view of an exemplary system according to the disclosure.

Referring to FIG. 7, in one embodiment, the system 100 includes a pair of the support members 102, the carriages 104, the travel line 108, the lift line 110, at least one rotation line 560, a load rotation assembly 570, a rotation mechanism (not shown), the travel positioning mechanism 112 and/or the lift positioning mechanism 114 (see FIG. 1), and the control system 116 (see FIG. 1). Alternatively, in one embodiment, the carriage 104 includes the cart frame 124, the cam brake 120, the plurality of wheels 126, and a load rotation assembly 570. The load rotation assembly 570 is engaged by the rotation line 560 to rotate the load 106 along a substantially vertical axis relative to the carriage 104 when the carriage 104 is at rest.

Figure 8:
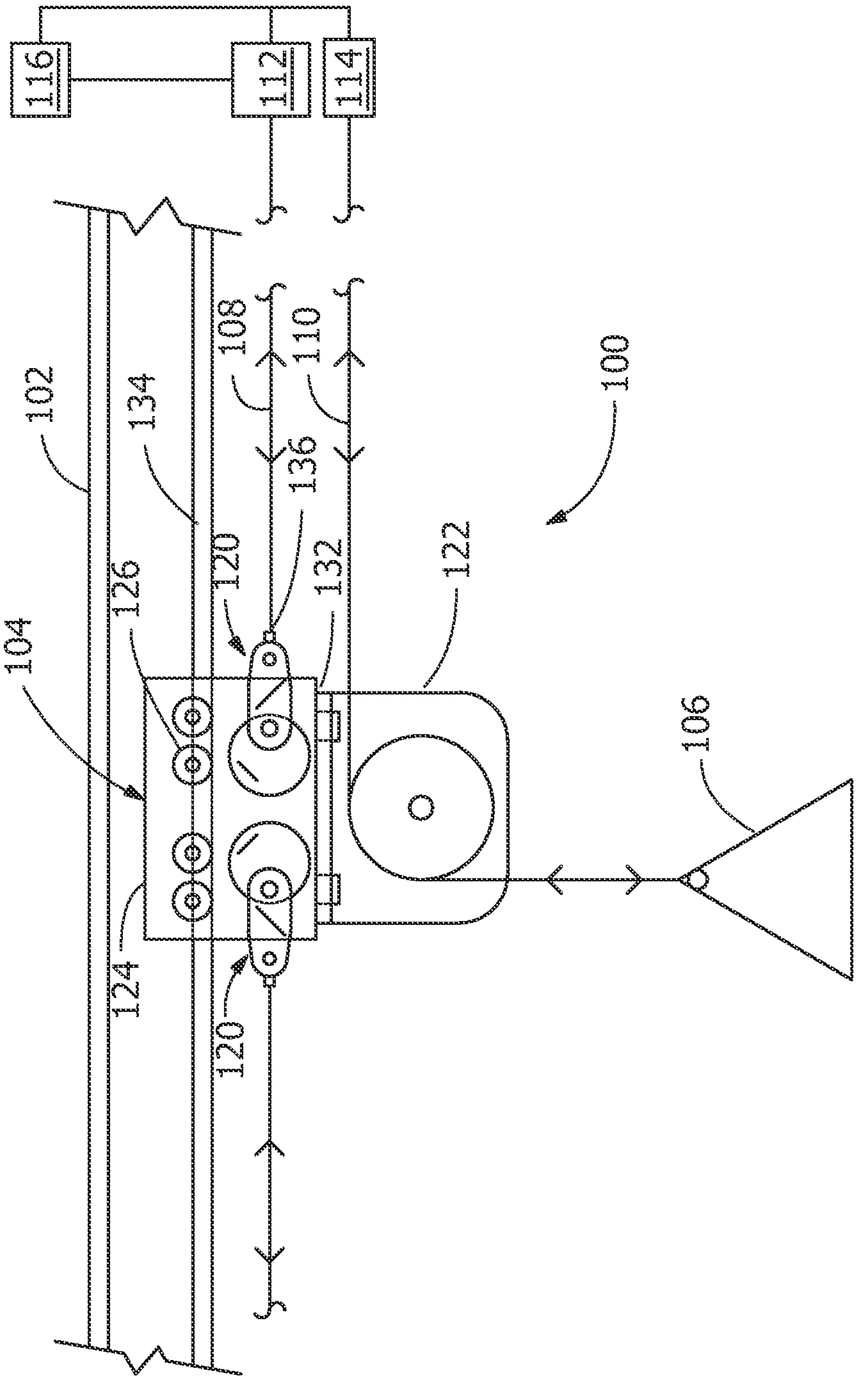
FIG. 8 shows a side schematic view of an exemplary system with dual engagement articles according to the disclosure.

Referring to FIG. 8, in an alternative embodiment, the system 100 includes the support member 102, the carriage 104, the travel line 108, the lift line 110, the travel positioning mechanism 112, and/or the lift positioning mechanism 114, and the control system 116. The carriage 104 includes the cart frame 124, a pair of the opposing cam brakes 120 arranged on opposing sides of the carriage 104, and a plurality of the wheels 126. In this embodiment, the lift line 110 is capable of being adjusted and oriented from either side, for example, by having a rotatable portion, thereby benefiting from including the opposing cam brakes 120 to respond to momentum in opposing directions. Likewise, in one embodiment, a plurality of cam brakes 120, for example, three cam brakes, four cam brakes, or more are included. In a further embodiment having a plurality of the cam brakes 120, each of the cam brakes 120 has a different load, thereby permitting additional control.

In one embodiment, a method of positioning the load 106 relative to support member 102 includes adjusting the relative position of the load 106 by adjusting the lift line 110 in conjunction with adjusting the travel line 108 in the system 100. In one exemplary embodiment, the method includes adjusting the relative position of the load 106 by increasing slack in the travel line 108 to position the engagement member in the positioning system 100.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An engagement article capable of selectively restricting movement or securing a suspended load in response to a rapid change in tension in one or more lines, comprising:

a travel positioning mechanism operatively connectable to a carriage and at least one travel line, the travel positioning mechanism capable of positioning the carriage at intermediate positions along the travel line; and the carriage operatively connectable to the at least one travel line and at least one lift line for supporting a load, the carriage operatively connectable to a first end and a second end of the travel line.

2. The engagement article of claim 1, comprising a lift positioning mechanism operatively connectable to the carriage.

3. The engagement article of claim 1, comprising a lift positioning mechanism operably connectable to a carriage; and the carriage operably connectable to at least one travel line and at least one lift line for supporting a load.

4. The engagement article of claim 2, wherein at least one of the travel positioning mechanism and the lift positioning mechanism is a manual device.

5. The engagement article of claim 2, wherein the lift positioning mechanism is operatively connectable to a first end of the lift line and the second end of the lift line is operatively connectable to the load.

6. The engagement article of claim 1, wherein the travel positioning mechanism includes an airflow interaction feature.

7. The engagement article of claim 1, wherein the travel positioning mechanism includes a weighted member and a cam engagement member pivotally connected eccentrically with respect to the center of gravity of the cam engagement member.

8. The engagement article of claim 7, wherein the travel positioning mechanism includes an airflow interaction feature formed in at least one of the weighted member and the cam engagement member.

9. The engagement article of claim 1, comprising a first travel positioning mechanism operably connectable to a carriage, the first travel positioning mechanism operatively connectable to at least one travel line; and a second travel positioning mechanism operatively connectable to at least one travel line, the second travel positioning mechanism positioned opposite the first travel positioning mechanism;

wherein the carriage is operatively connectable to at least one lift line for supporting a load.

10. The engagement article of claim 1, comprising a first travel positioning mechanism operatively connectable to a carriage, the first travel positioning mechanism operatively connectable to at least one travel line;

a second travel positioning mechanism operatively connectable to at least one travel line, the second travel positioning mechanism positioned opposite the first travel positioning mechanism; and wherein the carriage is operatively connectable to at least one travel line.

11. The engagement article of claim 10, wherein at least one of the first travel positioning mechanism and second travel positioning mechanism includes an airflow interaction feature.

12. The engagement article of claim 1, comprising a travel positioning mechanism operatively connectable to a carriage, the travel positioning mechanism operatively connectable at a first connection to at least one travel line;

the travel positioning mechanism operatively connectable at a second connection to at least one travel line, the second connection positioned opposite the first connection;

the carriage operatively connectable to at least one lift line for supporting a load; and wherein the travel positioning mechanism having an airflow interaction feature.

13. A system comprising an engagement article capable of selectively restricting movement or securing a suspended load in response to a rapid change in tension in one or more lines, the system further comprising:

a carriage operatively connectable to at least one lift line for supporting a load;

the engagement article comprising a travel positioning mechanism operatively connectable at a first connection to at least one travel line;

the travel positioning mechanism operatively connectable at a second connection to at least one travel line, the second connection positioned opposite the first connection; and wherein the travel positioning mechanism having an airflow interaction feature.

14. A process of selectively restricting movement or securing a suspended load comprising:

providing an engagement article in response to a rapid change in tension in one or more lines, wherein the engagement article is a travel positioning mechanism operatively connectable to a carriage and a travel line, the carriage operatively connectable to at least one lift line for supporting a load and the travel line, wherein the engagement article comprises a lift positioning mechanism operatively connectable to the carriage, wherein at least one of the travel positioning mechanism and the lift positioning mechanism includes an airflow interaction feature; and actuating the engagement article.

* * * * *